United States Patent [19]
Funabashi et al.

[11] Patent Number: 4,716,522
[45] Date of Patent: Dec. 29, 1987

[54] MICROCOMPUTER SYSTEM WITH BUFFER IN PERIPHERAL STORAGE CONTROL

[75] Inventors: Tsuneo Funabashi, Hachioji; Kazuhiko Iwasaki, Kokubunji; Hideo Nakamura, Nishitama, all of Japan

[73] Assignee: Hitachi, Ltd., Tokyo, Japan

[21] Appl. No.: 473,861

[22] Filed: Mar. 10, 1983

[30] Foreign Application Priority Data

Mar. 10, 1982 [JP] Japan ............................. 57-36408

[51] Int. Cl.⁴ ............................................. G06F 3/06
[52] U.S. Cl. ....................................................... 364/200
[58] Field of Search .................................. 360/40, 49; 364/200 MS File, 900 MS File

[56] References Cited
U.S. PATENT DOCUMENTS

| 4,067,059 | 1/1978 | Derchak | 364/200 |
| 4,161,778 | 7/1979 | Getson, Jr. et al. | 364/200 |
| 4,241,420 | 12/1980 | Fish et al. | 364/900 |
| 4,283,760 | 8/1981 | Kita et al. | 364/200 |
| 4,334,287 | 1/1982 | Wiedenman et al. | 364/900 |
| 4,339,794 | 7/1982 | Hideshima et al. | 364/200 |
| 4,399,503 | 8/1983 | Hawley | 364/200 |
| 4,456,933 | 6/1984 | Schneider et al. | 360/49 |
| 4,473,879 | 9/1984 | Tachiuchi et al. | 364/200 |
| 4,475,155 | 10/1984 | Oishi et al. | 364/200 |
| 4,603,380 | 7/1986 | Easton et al. | 364/200 |

OTHER PUBLICATIONS

Bounds, P., "Buffering High Speed Data for Minicomputer Input", Computer Design, 7/73, pp. 69-73.

Primary Examiner—Gary V. Harkcom
Assistant Examiner—Randy W. Lacasse
Attorney, Agent, or Firm—Antonelli, Terry & Wands

[57] ABSTRACT

A microcomputer system has a peripheral storage control equipped with both a circuit which is responsive to a transfer command received from an MPU to set in a counter a transfer start address, which is designated subsequent to that command. The counter to supply an address for a buffer to control transfer of data from the output of the buffer to a common bus connected between the MPU and a RAM. A circuit is provided for controlling the aforementioned counter to count up in response to a transfer acknowledge signal which is subsequently received from a direct memory access control. In order that the data in the buffer may not be transferred to the RAM but may be rewritten, the peripheral storage control is further equipped with both a circuit for setting a rewrite address also received from the MPU in the counter, which is operative to identify the address of the selected buffer, in association with a rewrite command received from the MPU, and a circuit is also provided for applying the rewrite signal to the buffer each time the rewrite data is received after the setting operation from the MPU.

5 Claims, 2 Drawing Figures

4,716,522

MICROCOMPUTER SYSTEM WITH BUFFER IN PERIPHERAL STORAGE CONTROL

FIELD OF THE INVENTION

The present invention relates to a microcomputer system which is equipped with a control for a peripheral storage.

BACKGROUND OF THE INVENTION

In order to read out data from a floppy disc and to store this data in a random access memory (RAM) used by a microcomputer (MPU), a buffer has been provided in the control of the floppy disc drive so that data which has been read out from that disc is transferred to the RAM after it first has been stored in that buffer. The MPU is made operative to perform data processing using that data or to rewrite a portion of the data and to store it again on the floppy disc through the buffer.

In previously proposed systems, the reading of data from the disc has been performed for respective regions of the disc, called "sectors". Therefore, the buffer has been provided with a capacity corresponding to one sector or an integral multiple thereof. In such systems, moreover, even when the MPU makes use of only a portion of the data in one sector of the floppy disc, the contents of the sector as a whole are read out to the buffer and are then wholly transferred to the RAM. Since the undesired data is also transferred with the desired data, the data bus is occupied for an unnecessary time in this data transfer.

Even when the MPU rewrites predetermined data of one sector, all the data of the sector is transferred from the buffer, and the MPU then accesses the RAM to rewrite the data. After that, the data for the whole sector, including the corrected data, is stored again on the disc through the buffer. This results in a useless process in which data requiring no rewriting is also transferred to the RAM.

In view of the facts thus far described, it is desired that the microcomputer system be constructed such that only the desired portion of the data in the buffer disposed in a peripheral storage control is transferred to the RAM at any given time. In case the data in the buffer is to be rewritten, moreover, it is desired that the buffer be accessed directly by the MPU so that the data may be rewritten. In order to construct the peripheral storage control of an integrated circuit in this instance, and also avoid any need for increasing the number of pins necessary for the external storage control, it is desirable that the foregoing objectives be realized by using the signal lines, which are provided in the conventional microcomputer, as they are as much as possible, i.e. without increasing the number of signal lines provided between major components of the system.

SUMMARY OF THE INVENTION

It is, therefore, an object of the present invention to provide a microcomputer system which is enabled to selectively transfer desired portion of data in a buffer disposed in a peripheral storage control to a RAM.

Another object of the present invention is to provide a microcomputer system which can selectively transfer the data in the aforementioned buffer even if the signal lines employed in the conventional microcomputer system are used as they are as much as possible.

In order to achieve those objects, according to the present invention, the peripheral storage control is equipped with both a circuit made responsive to a transfer command from an MPU to set a transfer start address, which is designated subsequent to that command, in a counter, which is made operative to give an address for a buffer, and to transfer the output of the buffer to a common bus connected between the MPU and a RAM, and a circuit for controlling the aforementioned counter to count up in response to a transfer acknowledge signal which is subsequently fed from a direct memory access control.

In order that the data in the buffer may be rewritten without being transferred to the RAM, the peripheral storage control is further equipped with both a circuit for setting a rewrite address also obtained from the MPU into the counter, which is operative to give the address of the buffer, in association with a rewrite command fed from the MPU, and a circuit for applying the rewrite signal to the buffer each time the rewrite data is given after the setting operation from the MPU.

DESCRIPTION OF THE PREFERRED EMBODIMENT

Figure 1:
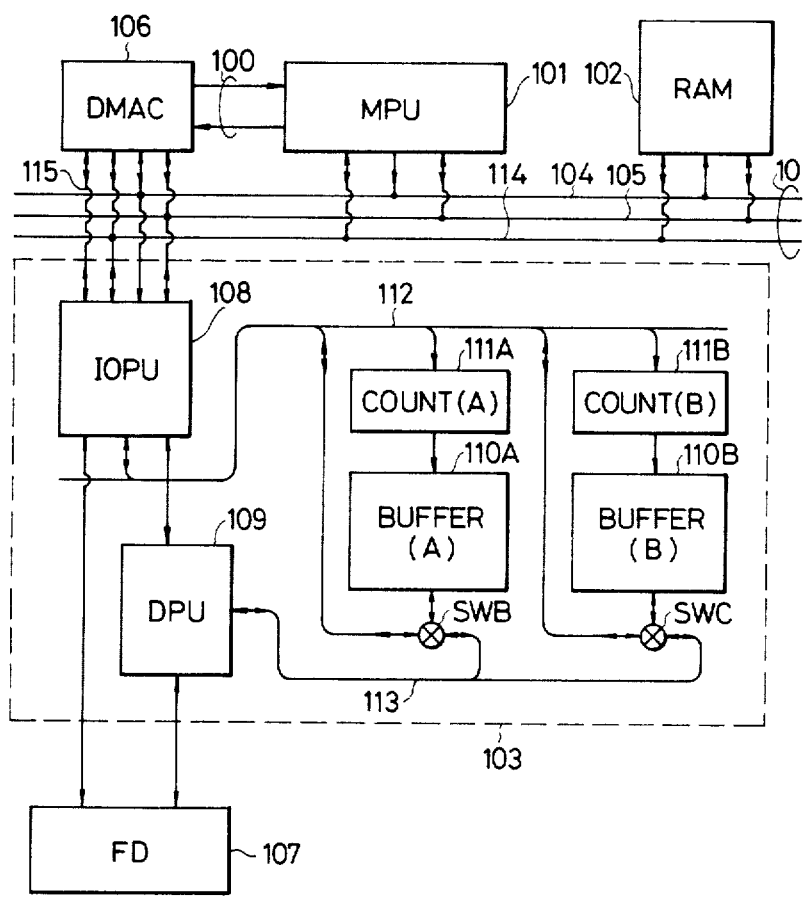
FIG. 1 is a block diagram showing the overall construction of a microcomputer system according to the present invention.

In FIG. 1, a microcomputer (MPU) 101 is connected with a random access memory (RAM) 102, a direct memory access (DMA) control 106 and a control unit 103 for a floppy disc (FD) 107 including a disc drive (not shown) through a common bus 10, which is composed of an address bus 104, a data bus 105 and a control bus 114. The FD control unit 103 controls the access to the floppy disc 107 in response to a signal coming from the MPU or the DMA control 106. Moreover, the FD control 103 includes an I/O processing unit (IOPU) 108 for controlling the operation of the FD control 103 in response to commands from the MPU, a data processing unit (DPU) 109 for controlling the transfer of data to and from the floppy disc 107 and for effecting an error check of the data coming from the floppy disc 107, for example, buffers (A) and (B) 110A and 110B for storing the data from the floppy disc 107, and counters (A) and (B) 111A and 111B for supplying addresses to those buffers. The buffers (A) and (B) each have a capacity corresponding to one sector of the floppy disc 107.

The DMA control 106 is connected to the common bus 10 and to the MPU 101 and the IOPU 108 through signal lines 100 and 115, respectively, and is provided in the form of a well-known DMA control. More specifically, the DMA control 106 controls the data transfer between the FD control 103 and the RAM 102 in place of the MPU 101.

Figure 2:
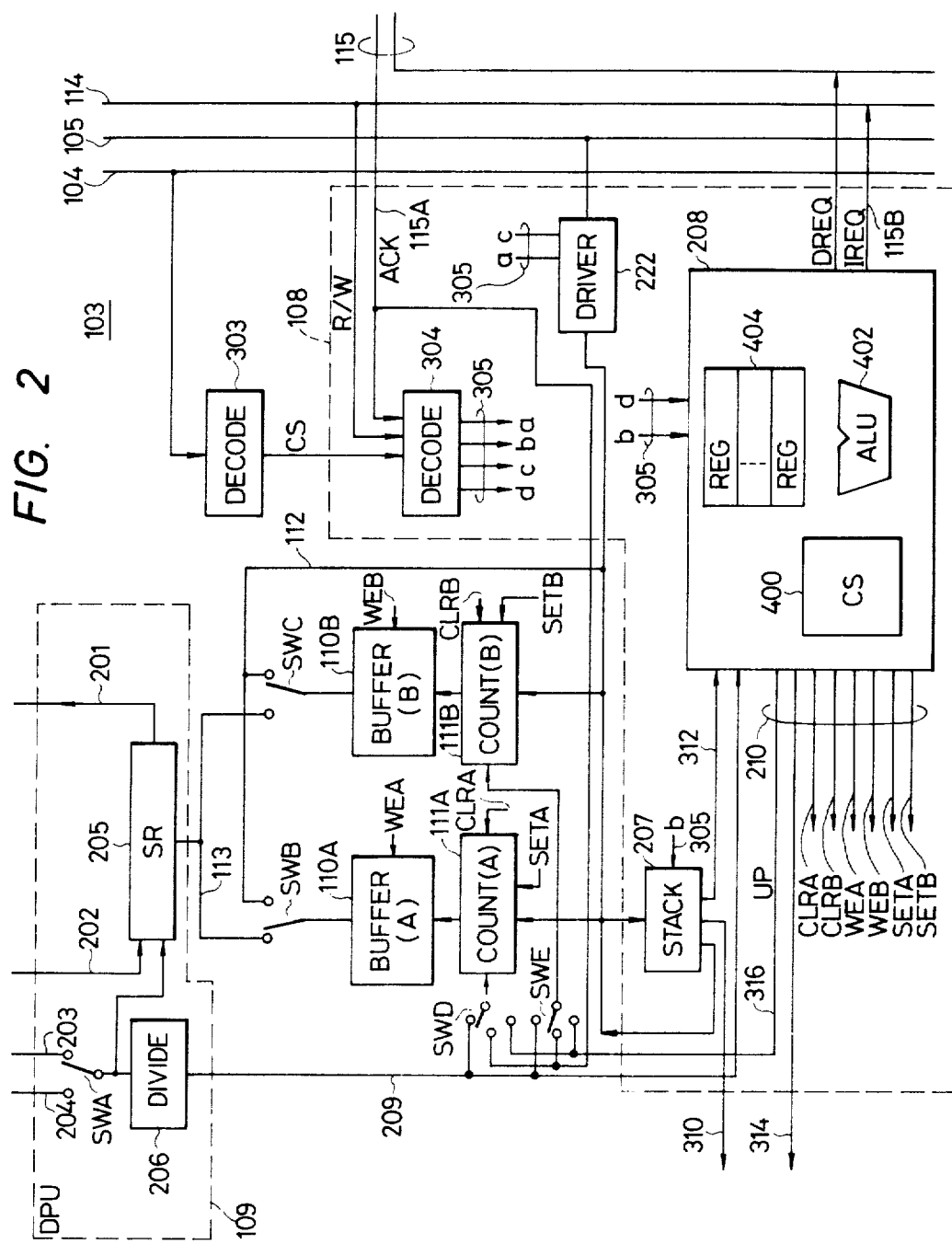
FIG. 2 is a circuit diagram showing the detailed construction of an essential portion of an I/O processing unit and a data processing unit shown in FIG. 1.

FIG. 2 shows those portions of the IOPU 108 and the DPU 109 which are associated with the present invention. A peripheral decoder 303 decodes the address on the bus 104 to determine whether this address has been assigned to the IOPU, and generates a chip select signal CS if the result is affirmative. The IOPU 108 is connected to the peripheral decoder 303, the data bus 105, the control bus 114 and the signal line 115, and is constructed in the form of a single integrated circuit.

An internal decoder 304 controls both the data transfer direction at a bus driver 222 and the setting of data into a register stack 207 in response to the chip select signal CS, a read/write signal R/W received from the bus 114 and a DMA transfer acknowledge signal ACK received from the DMA control 106 through the line 115. When both the signals CS and R/W take a value of 1 or when the signal ACK takes the value 1 while the signal R/W takes a value of 0, the internal decoder 304 controls the bus driver 222 to adopt a send mode of operation. When the signal CS takes the value 1 while the signal R/W takes the value 0 or when both the signals ACK and R/W take the value 1, on the other hand, the internal decoder 304 controls the bus driver 222 to adopt a receive mode of operation.

The register stack 207 is made operative to store either a command, which is received from the MPU 101 through the bus 105 and the driver 222, or data for executing that command. The register stack has a stack pointer (although not shown) which is made operative to indicate the number of a register into which the command or data is to be stored.

A microinstruction control (which will be hereafter referred to as a "$\mu$ control") 208 is provided to control the counters (A) and (B), the buffers (A) and (B) and other circuit elements in response to a microinstruction identified by the command received from the MPU. For this purpose, the $\mu$ control 208 is equipped with a microinstruction storage 400, an arithmetic and logical operation unit 402, a group of internal registers 404 and those additional elements commonly provided in a microcomputer of the well-known microprogram control type.

The DPU 109 includes a shift register 205 of 8 bits capacity, which receives data serially through a line 202 from the floppy disc 107. The data in that shift register 205 is fed in parallel through a disc bus 113 to the buffer (A) or (B). When data is to be stored on the floppy disc 107, the data in the buffer (A) or (B) may be transferred in parallel through the disc bus 113 to the shift register 205 from the buffer (A) or (B), and the data may then be transferred serially through a line 201 to the floppy disc 107. Switches SWB and SWC are provided to selectively connect the buffer (A) or the buffer (B) to the disc bus 113 or the internal bus 112.

The divider 206 in the DPU circuit 109 operates to divide either the frequency of a read clock 203, or that of a write clock 204 which is received from the floppy disc 107, into one-eighth of the received frequency. The output of that divider 206 is used to increment the counter (A) or (B). Switches SWD and SWE are provided to respectively select the clock and other control signals to be supplied to the counters (A) and (B) from the divider 206, the DMA via line 115A or from the $\mu$ control 208 via line 316.

The operations of the microcomputer system will be described in detail in the following.

Read Mode of Data from Disc to Buffer

The MPU 101 sequentially transmits both a first command for instructing the FD control 103 to read out the data from the disc and the data necessary for executing that command to the FD control 103. The data necessary for the execution of the first command includes a sector identification number ID for designating a sector in which to start the reading operation from the floppy disc 107, a buffer number BN indicating which of the buffers (A) or (B) is the buffer selected to store the first data read out from the floppy disc 107, and the number of sectors SN involved in the reading operation from the floppy disc 107, which is always two or less.

The MPU executes a store instruction having both the address which has been assigned to the FD control 103 and data indicating the first command. As a result of the execution of that store instruction, the MPU feeds the bus 104 with the address of the FD control 103 and the bus 105 with the first command and places the signal R/W on the bus 114 with a value 0. The decoder 303 decodes the address on bus 104 to generate the chip select signal CS at a value 1. In response to this chip select signal CS and the signal R/W having the value 0, the decoder 304 feeds line 305 with a signal a to control the bus driver 222 to adopt the receive mode in which it receives data from the bus 105.

The decoder 304 further feeds the stack 207 with a signal b through the line 305 to indicate that the data on an internal bus 112 is to be set therein. Thus, the register stack 207 stores the first command which has been received from the MPU.

The signal b from the decoder 304 is also fed to the $\mu$ control 208. This circuit is so programmed that it is usually in a standby condition to await the command input, so that it accesses the leading data on the stack 207 as soon as it receives the signal b in that state. In order to make that access possible, moreover, the registers in the stack 207 are so constructed that any register can be accessed individually by the $\mu$ control 208. The $\mu$ control 208 receives the leading data through a line 312 from the stack 207 and executes a program routine to decode which command the received data corresponds to. After this decoding operation, the $\mu$ control 208 executes the first microinstruction routine for the first command at that time. By making use of the fact that for each command the data necessary for executing the command is known in advance, it can be determined at the start of the microinstruction routine whether or not all the decoded data necessary for the command execution is being received from the MPU and stored in the stack 207. In this regard, after having executed the store instruction relating to the first command, the MPU proceeds to execute, in a predetermined order, a plurality of store instructions for sequentially storing the aforementioned data necessary for that command execution in the FD control 103, so that the data is sequentially stored in the stack 207. During this storing operation, an incrementing of the stack pointer (although not shown) is effected each time the signal b is received. The $\mu$ control 208 can determine from the number of times it receives the signal b, which takes place for each storage of one data item in the stack 207, that all the necessary data has been set in the stack 207.

After all data is stored, the following operations are conducted in accordance with a first microinstruction routine. First of all, the $\mu$ control 208 feeds a start signal to the floppy disc 107 and the DPU through a line 314. At this time, the sector identification number ID and the number of sectors SN are read out from the stack 207 and sent through a line 310 to the DPU. This DPU is equipped with a circuit which is made operative to select only the data designated by the received data ID and the number value SN from all the data which has been read out from the floppy disc 107 and to transfer the selected data on the line 202 to the shift register 205.

Next, the $\mu$ control 208 reads out the buffer number BN from the stack 207 through the line 312 and controls the switch SWB (or SWC) so that the buffer (A) (or (B)) designated thereby may be connected with the disc bus 113. The μ control 208 also feeds a line 210 with a signal CLRA (or CLRB) for clearing the counter (A) (or (B)) corresponding to that selected buffer (A) (or (B)). Moreover, the switch SWD (or SWE) is switched to the output line of the frequency divider 206, and a switch SWA is switched to the line 203, so as to apply the read clock pulses to the divider 206 and to the shift register 205.

In the DPU, the read data 202 is received in synchronism with the read clock 203, so that the data is serially written into the shift register 205. The frequency divider 206 feeds a line 209 with a clock signal which has its frequency divided into one eighth of that of the read clock signal. As a result, each time data of 8 bits is shifted into the shift register 205 having a capacity of 8 bits, the clock 209 is generated. In response to this clock 209, the μ control 208 feeds the line 210 with a write enable signal WEA (WEB) for the buffer (A) (or (B)) designated by the MPU. Thus, the 8-bit data which has been read out from the floppy disc 107 is stored in the area of the buffer whose address is designated by the counter (A) (or (B)). After that, the counter (A) (or (B)) is incremented in response to the clock 209. Thus, the bytes of data read out from the floppy disc 107 are stored sequentially one by one in the selected buffer (A) (or (B)).

During this time, the μ control 208 performs a counting operation of the stored data number by the use of the arithmetic and logical operation unit 402 and the register 404, for each time of writing data into the buffer (A) (or (B)), and checks whether or not the writing operation has been conducted up to the last address of the buffer (A) (or (B)). When the check result is affirmative, it is further checked to determine whether the sector number SN designated by the MPU and stored in the stack 207 is 1 or 2. When it is found that the sector number is 1, the data reading operation is ended. When the sector number SN is 2, on the other hand, the μ control 208 clears the counter (B) and controls the switch SWC (or SWB) thereby to connect the shift register 205 with the buffer (B) (or (A)) and to set the switch SWE (or SWD) to the clock 209. Then, the SN stored in the stack 207 is decremented. After that, the data is stored in the buffer (B) (or (A)) similarly to the above-described writing operation in the buffer (A) (or (B)).

When the data of one or two sectors is stored in the aforementioned manner in the buffer (A) (or (B)), the μ control 208 applies an interrupt request IREQ on line 114 thereby to indicate that the data reading operation has ended and to return the stack pointer (although not shown) and other circuits to their initial states.

Data Transfer Mode from Buffer to RAM

In the case where the data stored in the buffer (A) (or B)) is to be transferred to the RAM, the MPU initializes the DMA control 106. Specifically, the MPU executes a store instruction to the DMA control 106 thereby to set the start address or the like identifying the region of the RAM which is to receive and store the data to be transferred.

After that, the MPU executes the instruction for forwarding to the IOPU 108 a second command for initiating a reading operation from the buffer (A) (or (B)) by causing the command to be stored in the stack 207. Moreover, the MPU initializes the IOPU 108 at this time. Specifically, the MPU executes a plurality of store instructions for indicating the number BN of the buffer to be read, the number WN of the bytes of the data to be read, and the buffer starting address of the data to be read, and stores this data in the stack 207 in the same manner as described in connection with the aforementioned first command.

In response to the second command newly stored in the stack 207, the μ control 208 reads out a buffer address BA from the stack 207 to the counters (A) and (B). The μ control 208 further reads out the buffer number BN from the stack 207 and feeds a set signal SETA (or SETB) to the counter (A) (or (B)) corresponding thereto so as to cause the selected counter to be set to the value of the buffer address BA. Thus, after the counter (A) (or (B)) has been preset with the buffer address BA, the switch SWB (or SWC) is set to the internal bus 112, and the data in the buffer at the address indicated by the counter (A) (or (B)) is read out to the internal bus 112.

Moreover, the switch SWD (SWE) is set to a line 115A by the μ control 208, which then sets a DMA transfer request DREQ on a line 115B and waits for the transfer acknowledge signal ACK to be fed from the DMA control 106 through the line 115A. In response to the rise of the signal DREQ, more specifically, the DMA control 106 feeds out a bus request signal to the MPU through the line 100 (as shown in FIG. 1). When the MPU returns the bus acknowledge signal via line 100, the DMA control 106 returns the transfer acknowledge signal ACK on line 115A and feeds the bus 104 with the transfer start address, which has already been given from the MPU, acknowledge thereby to set the signal R/W on the bus 114 at the value 0. In response to the signal ACK at the value 1 and the signal R/W having the value 0, the decoder 304 feeds the bus driver 222 with a signal c for bringing that driver 222 into a send mode and the μ control 208 with a signal d for indicating that mode.

As can be seen, data in the buffer at the address of the counter (A) (or (B)) is read out from the buffer (A) (or (B)) to the internal bus 112 and is transferred to the bus 105 when the bus driver 222 is brought into the send mode. In response to the value 0 of the signal R/W on the bus 114 and the address on the bus 104, the RAM stores the data received on the bus 105. On the other hand, subsequent to the data transfer, the ACK signal on the line 115A increments the counter (A) (or (B)) through the switch SWD (or SWE) so that the next byte of data is read out of the buffer to the internal bus 112.

The μ control 208 is so programmed that it counts the number of bytes of data which have been transferred to the bus 104 in response to the signal c from the decoder 304 and it detects whether or not the counted value is equal to the transfer byte number existing in the stack 207. If this detection result is negative, the μ control 208 holds the DMA transfer request DREQ on the line 115B. After sending the transfer acknowledge signal ACK to the IOPU, and at the end of store operation of the transferred byte into the RAM, the DMA control 106 checks whether the signal DREQ is 1 or not, and again feeds the signal ACK to the line 115A when the check result is affirmative. In addition, the signal R/W is left at the value 0, and the preceding RAM address is incremented and fed to the bus 104. After that, the next data byte is likewise written in the RAM from the buffer (A) (or (B)). After this, the remaining number of data bytes designated in advance by the MPU is similarly transferred from the buffer to the RAM.

Midway of the transfer operation being described, the μ control 208 checks whether or not the data byte in the last address location of the buffer (A) (or (B)) has already been transferred, each time the signal c is received from the decoder 304. For this operation, the μ control 208 is so programmed that it reads out the buffer address existing in the stack 207 and holds its incremented value therein each time it receives the signal c. When the check result is affirmative, the μ control 208 clears the counter (B) (or (A)), and operates to switch the switch SWC (SWB) to the internal bus 112, the switch SWB (or SWC) to the disc bus 113, the switch SWE (or SWD) to the line 115A, and the switch SWD (or SWE) to the line 209. Thus, the subsequent operations to be performed relate to a read out of the data from the buffer (B) (or (A)) and to a transfer of this data to the RAM.

When the byte number of the transferred data reaches a value designated by the MPU, as has been described hereinbefore, the μ control 208 sets the signal DREQ on the line 115B to the value 0 and places an interrupt signal IREQ on the line 114. In response to the change of the signal DREQ to the value 0, the DMA control 106 stops the sending of the signal ACK for requiring the next transfer. Thus, the MPU can be informed of the end of the data transfer operation.

By the operations thus far described, the MPU can transfer data having an arbitrary length starting from an arbitrary address of the buffer to the RAM.

Rewrite of Data in Buffer

When the data in the buffer (A) (or (B)) is to be rewritten, the MPU executes a plurality of store instructions to write a third command for indicating the rewriting operation, the buffer number BN to be rewritten, the leading buffer address BA of the data to be rewritten, and the byte number WN of the data to be rewritten in the stack 207 sequentially in accordance with similar procedures to the aforementioned ones. In response to detection that the third command has been set in the stack 207, the μ control 208 reads out the buffer address BA to the counters (A) and (B) from the stack 207 and sends the signal SETA (or SETB) for instructing the setting of that address into the counter (A) (or (B)) corresponding to the buffer number BN in the stack 207. Moreover, the switch SWD (or SWE) corresponding to that counter (A) (or (B)) is set to a line 316. Moreover, the switch SWB (or SWC) corresponding to the buffer number BN is set to the internal bus. After that, the MPU executes the store instruction, which produces both an address for the FD control 103 and data to be written in the buffer. As a result, the address of the FD control 103 and the data to be written are fed to the lines 104 and 105, and the signal R/W on the line 114 takes the value 0. As a result, the decoder 303 decodes the received address to produce a chip select signal CS and data is transferred from bus 105 through the bus driver 222 to the internal bus 112.

In response to the output b of the decoder 304, on the other hand, the μ control 208 feeds the write signal WEA (or WEB) to the buffer (A) (or (B)) corresponding to the buffer number BN existing in the stack 207. Thus, the write data from the MPU is stored in the buffer (A) (or (B)) designated by the MPU. The μ control 208 then feeds the line 316 with a signal for incrementing the counter (A) (or (B)). If the MPU sequentially executes the store instructions for different data, new data can be sequentially written in the buffer (A) (or (B)) from the area specified by the buffer address BA which has been set in advance in the stack 207. Each time the write signal WEA (or WEB) is issued, the μ control 208 checks whether or not the written data number is coincident with the byte number BN set in the stack 207. If this check result is affirmative, the FD control 103 is returned to its command awaiting state.

Transfer Mode from Disc to RAM

By the use of a fourth command, according to the present embodiment, the data read out from the disc can be transferred to the RAM as soon as it is stored in the buffer. Moreover, this transfer can be continuously performed for the data over the plural sectors by repeatedly using the buffers (A) and (B). The operations at this time can be realized by executing the read mode from the disc to the buffer and the transfer mode from the buffer to the RAM in parallel with each other, as has been described hereinbefore. Such a transfer mode can be realized by the use of only one command.

Write Mode from Buffer to Disc

In this mode, the clock 204 in the writing operation is generated outside the DPU and is selected in place of the clock 203 by the switch SWA. The data may be written in the shift registers 205 by means of the μ control 208 in the state in which the switch SWB (or SWC) connects the buffer (A) (or (B)) with the disc bus 113. This operation is similar in other respects to the transfer of data from the disc to the buffer.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

What is claimed is:

1. In a microcomputer system including a data processor; a random access memory; a common bus interconnecting said data processor and said random access memory; and a peripheral disc storage unit in which data is stored on a disc in sectors having a predetermined number of data blocks; a peripheral storage control for controlling data transfer between said peripheral disc storage unit and said random access memory under control of said data processor, comprising:
    an internal data bus;
    counter means connected to said internal data bus for storing memory addresses;
    buffer means connected to said counter means for storing a sector of data read out from said peripheral disc storage unit into, and for feeding a number of data blocks which may be less than that of a sector of data to said internal data bus from, a storage location thereof having an address corresponding to that stored in said counter means;
    switching means selectively connecting said buffer means to said internal data bus or said peripheral storage;
    data transfer means connected between said internal data bus and said common bus and connected to receive a transfer acknowledge signal from said data processor for controlling the direction of data transfer between said internal data bus and said common bus in response to both a read/write instruction signal received on said common bus and said transfer acknowledge signal from said data processor; and control means connected to said internal data bus and responsive to a predetermined command transferred to said internal data bus by said data transfer means for controlling said switching means, said counter means and said buffer means to effect connection between said buffer means and said peripheral disc storage unit to cause data transfer therebetween and to effect connection between said buffer means and said internal data bus to cause data transfer with said random access memory via said data transfer means and said common bus, including storing means for storing an indication of a number of blocks to be transferred and a read start address received from said data processor via said common bus and said data transfer means, means for setting said counter means with said read start address associated with said predetermined command and means for controlling said buffer means to read out a number of blocks of data, beginning at said read start address according to the data stored in said storing means.

2. A microcomputer system according to claim 1, wherein said control means comprises:

a register stack for storing a command received from said data processor via said data transfer means and said internal data bus; and microinstruction control means connected to said counter means and said buffer means for controlling said counter means and said buffer means, and which includes means for clearing the counter means and for sending a signal to said peripheral disc storage unit to initiate transfer of data from said peripheral disc storage unit to said buffer means in response to the command transferred to said register stack from said data processor, means for presetting in the counter means a buffer address of the data to be rewritten in response to said command and said buffer address received from said data processor, and means for feeding a write signal to said buffer means so as to store data to be written which is transferred from said data processor to said buffer means via said data transfer means and said internal data bus in response to a store command of said data processor.

3. A microcomputer system according to claim 1, characterized in that said control means further comprises means for incrementing or decrementing said counter means in the operation of transferring the data between said peripheral disc storage unit and said buffer means for purposes of transferring data blocks between said data processor and said buffer means.

4. A microcomputer system according to claim 1, wherein said data processor includes a direct memory access control which transfers data between said random access memory and said buffer means on behalf of said microcomputer.

5. In a microcomputer system including a data processor; a random access memory; a common bus interconnecting said data processor and said random access memory; and a peripheral disc storage unit in which data is stored on a disc in sectors having a predetermined number of data blocks; a peripheral storage control for controlling data transfer between said peripheral disc storage unit and said random access memory under control of said data processor, comprising:

counter means for storing memory addresses;

buffer means connected to said counter means for storing a sector of data read out from said peripheral disc storage unit into, and for feeding a number of data blocks which may be less than that of a sector of data to said internal data bus from, a storage location thereof having an address corresponding to that stored in said counter means;

data transfer means connected between said buffer means and said common bus for controlling the direction of data transfer between said buffer means and said common bus in response to signals received from said data processor; and control means connected to said data transfer means and responsive to a predetermined command from said processor means for controlling said counter means and said buffer means to effect data transfer between said buffer means and said peripheral disc storage unit and to effect data transfer between said buffer means and said data transfer means to cause data transfer with said random access memory via said data transfer means and said common bus, including storing means for storing an indication of a number of blocks to be transferred and a read start address received from said data processor via said common bus and said data transfer means, means for setting said counter means with said read start address associated with said predetermined command and means for controlling said buffer means to read out a number of blocks of data beginning at said read start address according to the data stored in said storing means.

* * * * *